July 18, 1939.  H. GORA  2,166,490
METHOD AND APPARATUS FOR MOLDING AND SECURING RUBBER OBJECTS TO FABRIC
Filed Oct. 17, 1935   10 Sheets-Sheet 1
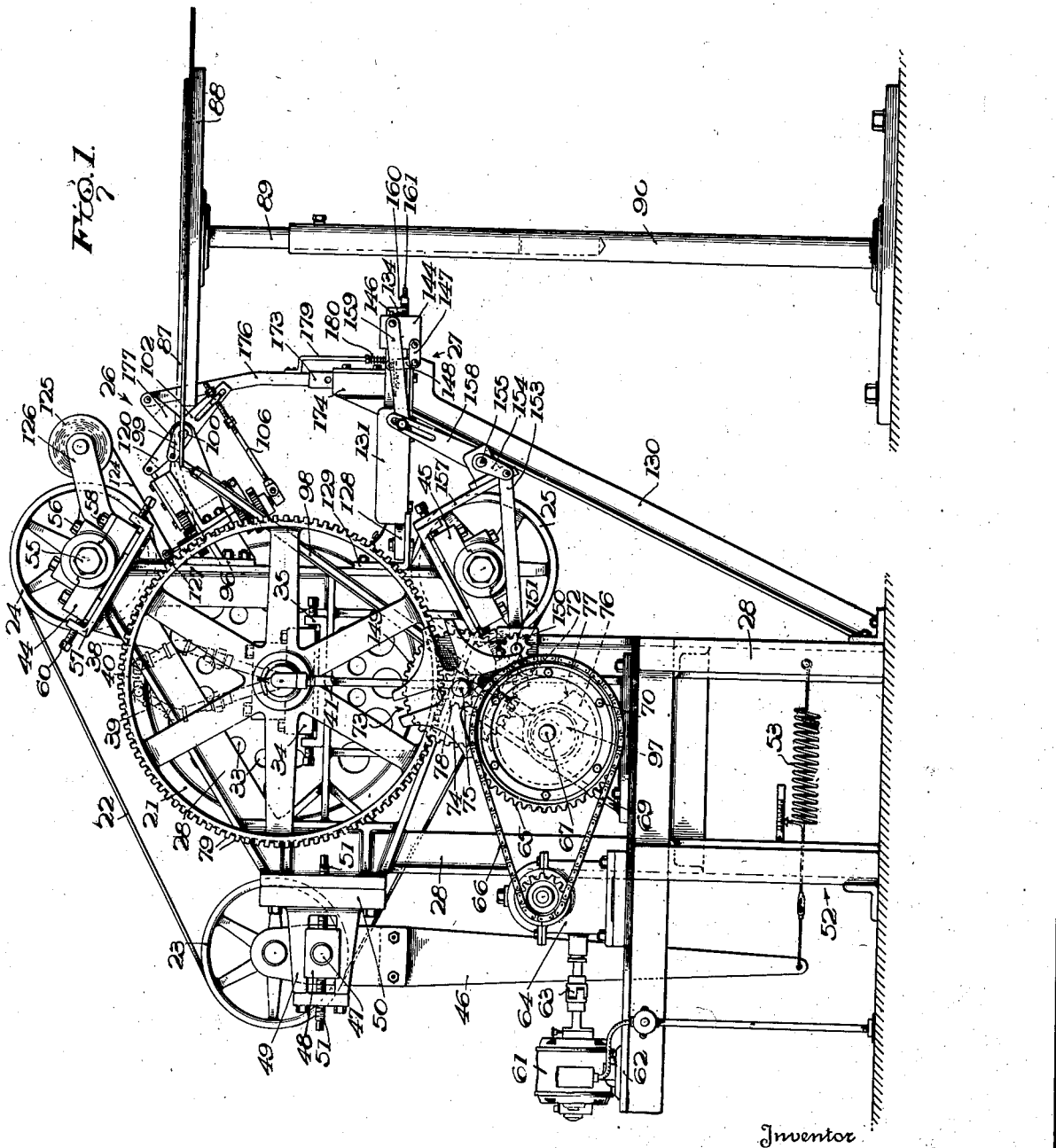
Inventor
Henry Gora
By Cameron, Kerkam + Sutton.
Attorneys July 18, 1939.　　　　　H. GORA　　　　　2,166,490
METHOD AND APPARATUS FOR MOLDING AND SECURING RUBBER OBJECTS TO FABRIC
Filed Oct. 17, 1935　　10 Sheets-Sheet 2
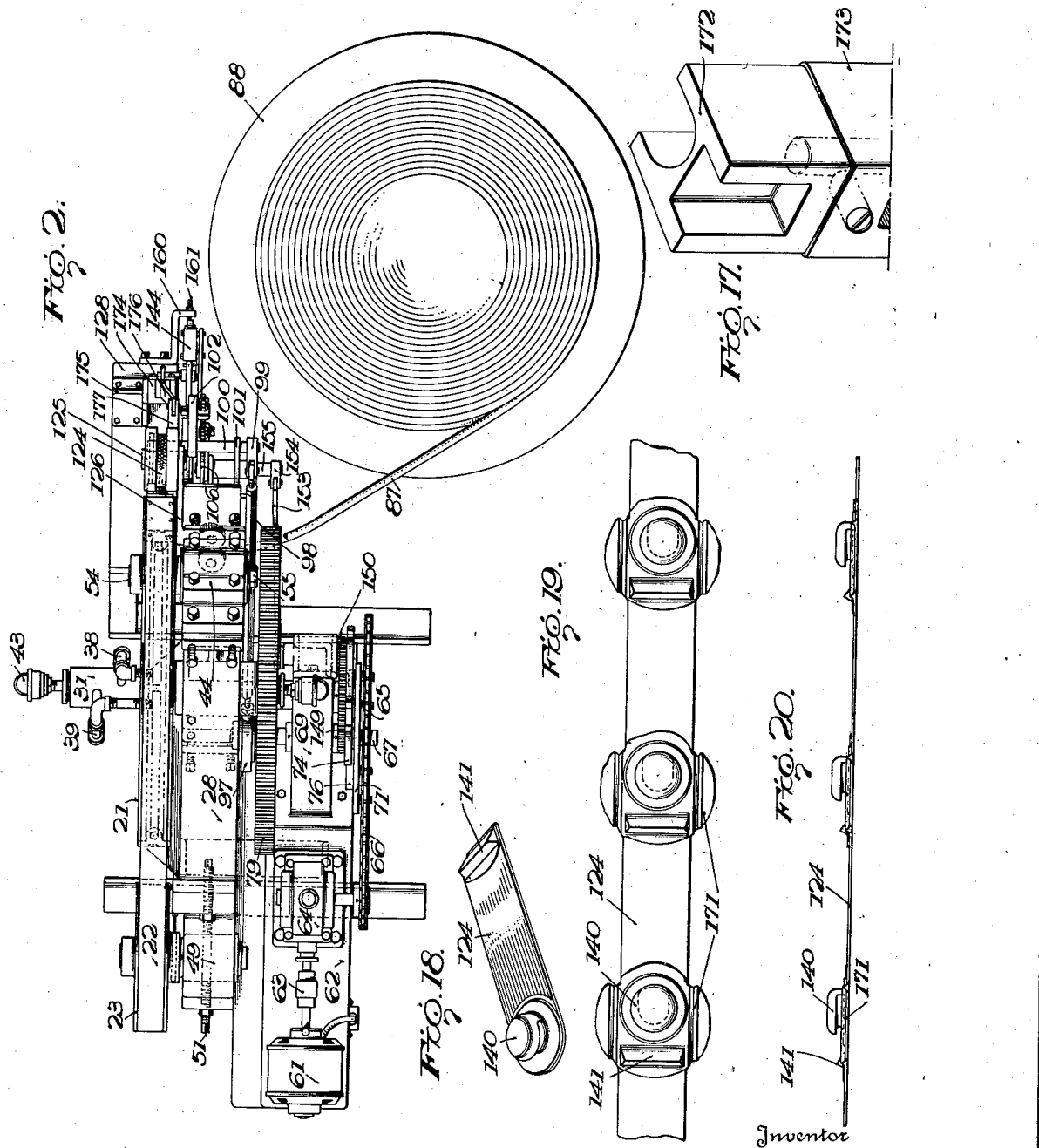

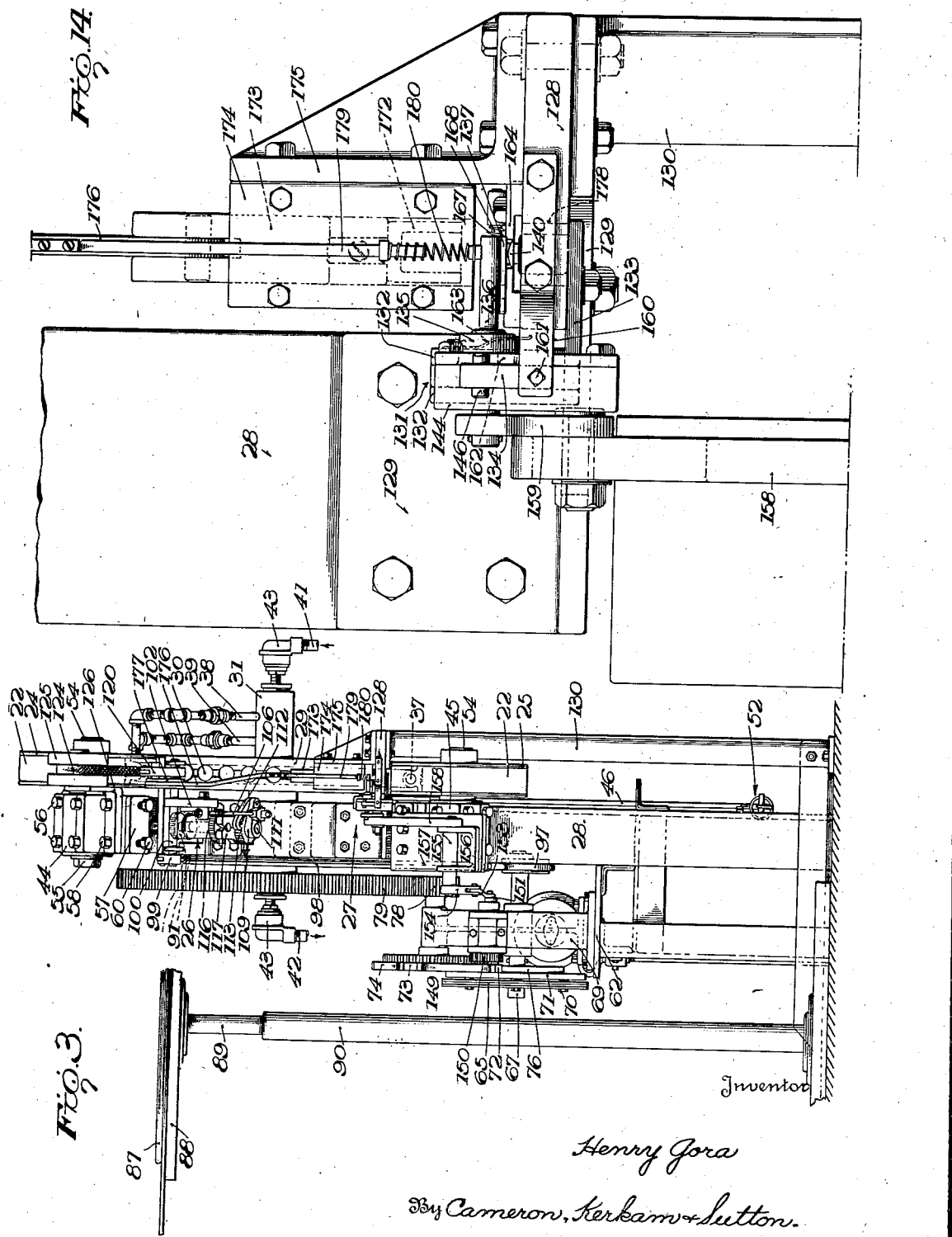

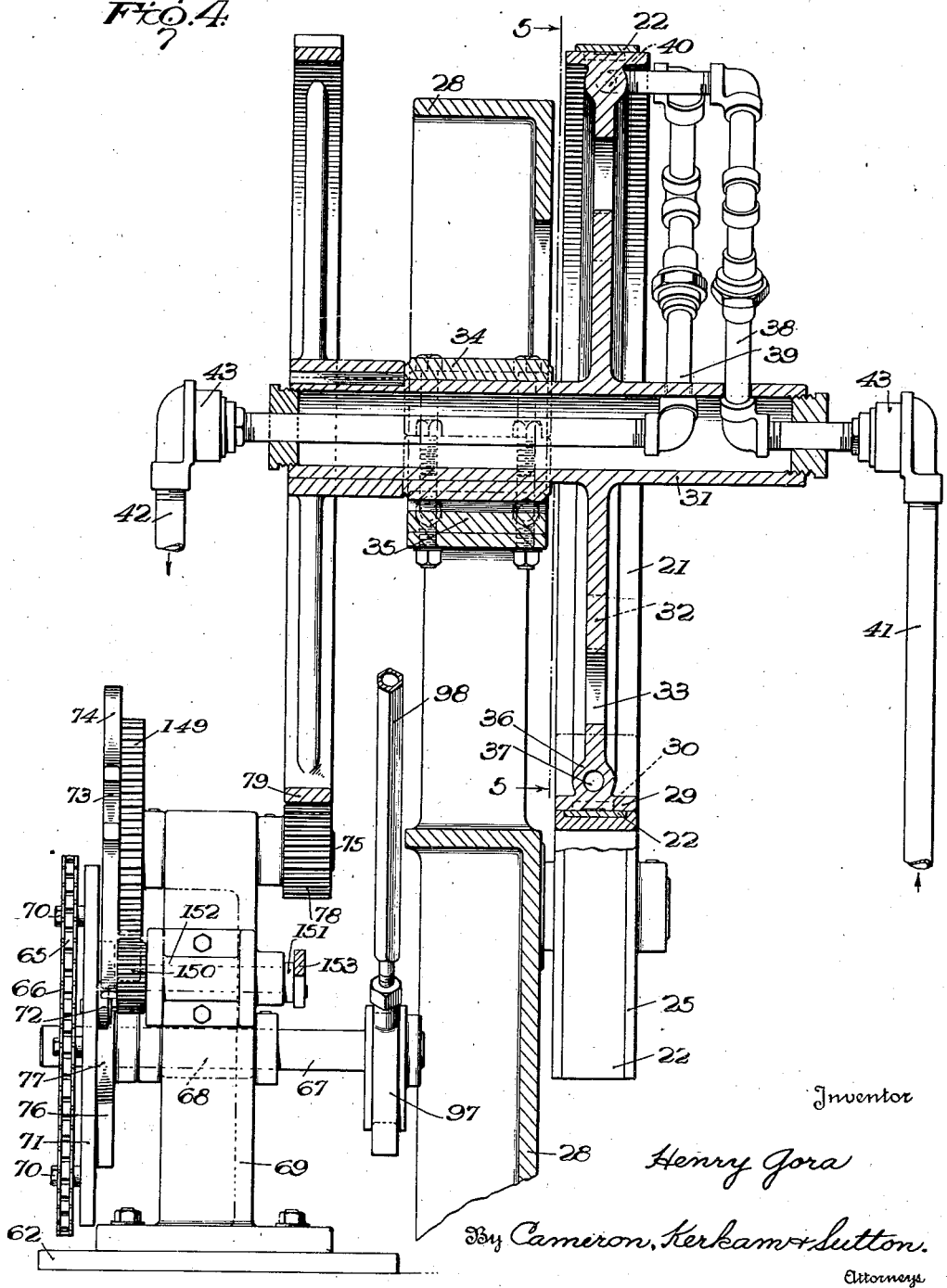

July 18, 1939.   H. GORA   2,166,490
METHOD AND APPARATUS FOR MOLDING AND SECURING RUBBER OBJECTS TO FABRIC
Filed Oct. 17, 1935   10 Sheets-Sheet 5
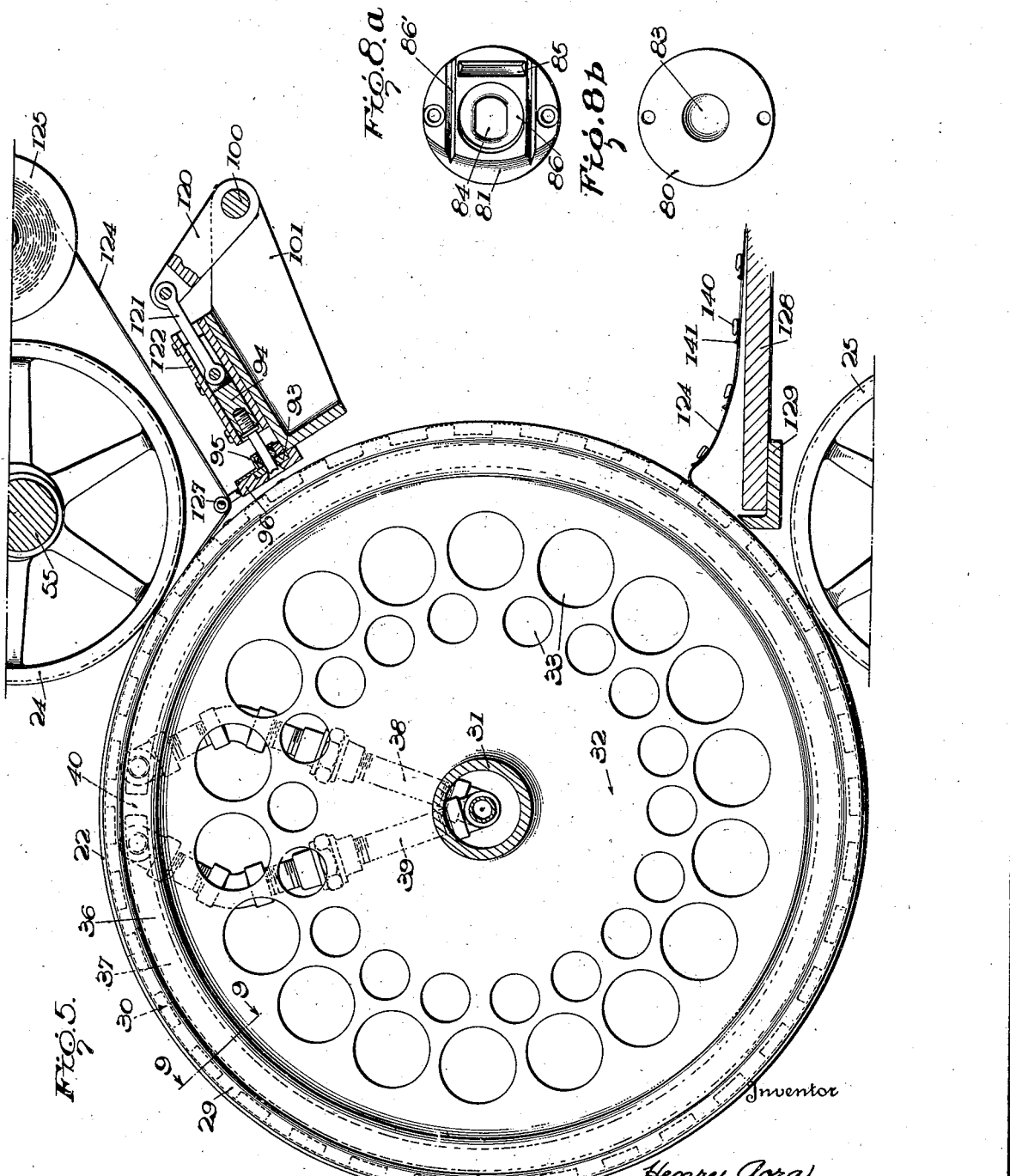
Inventor
Henry Gora
By Cameron, Kerkam & Sutton.
Attorneys

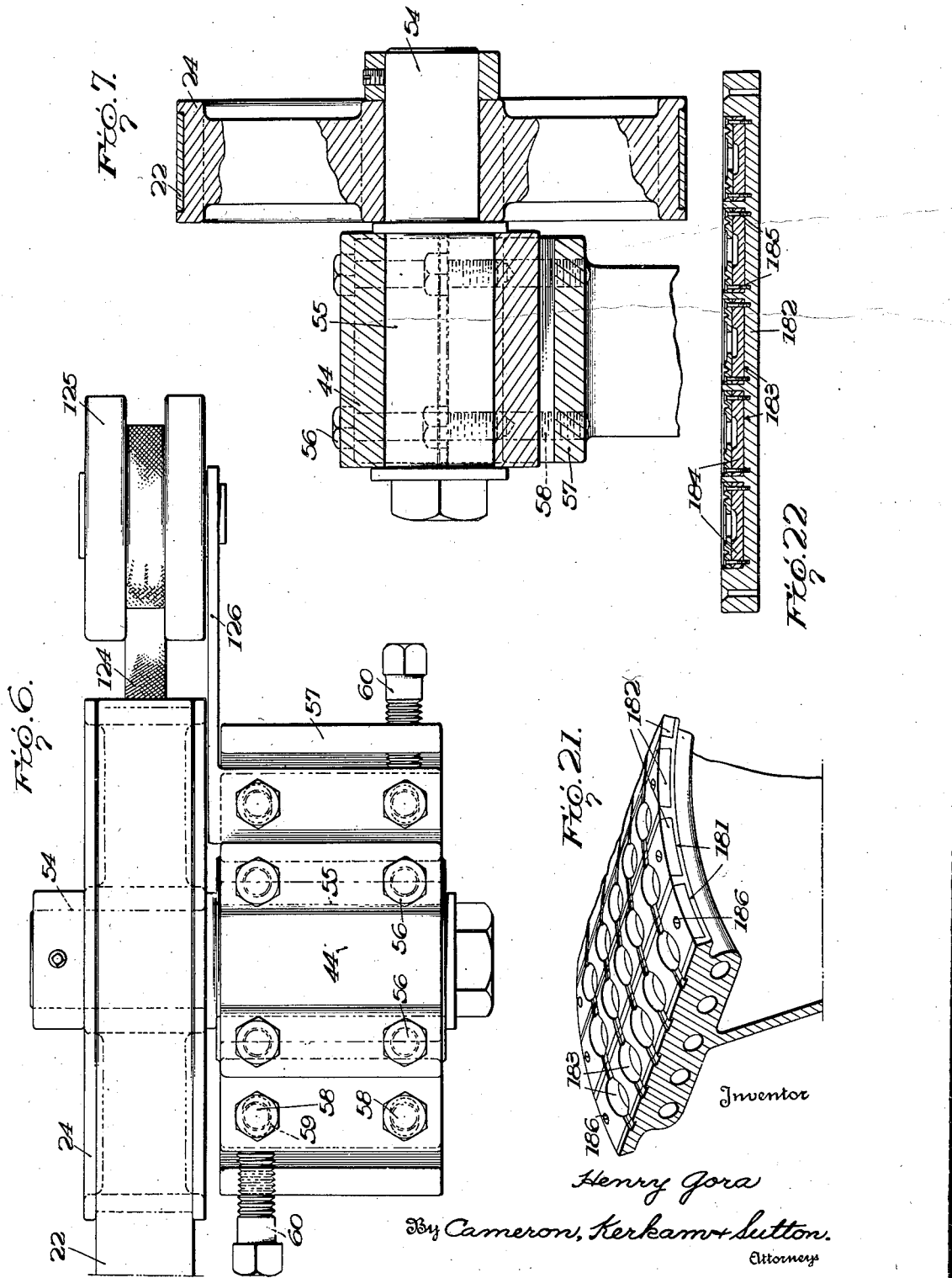

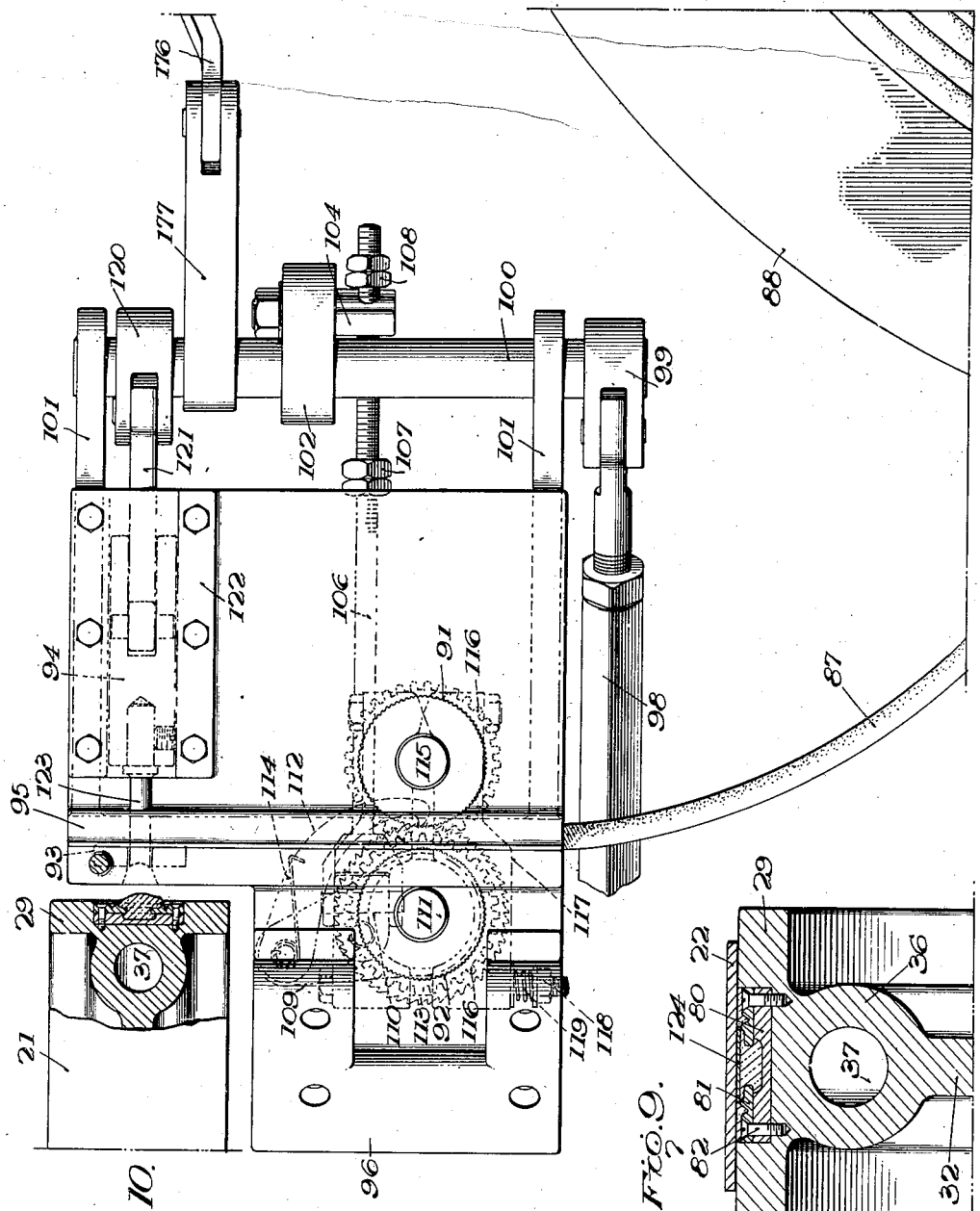

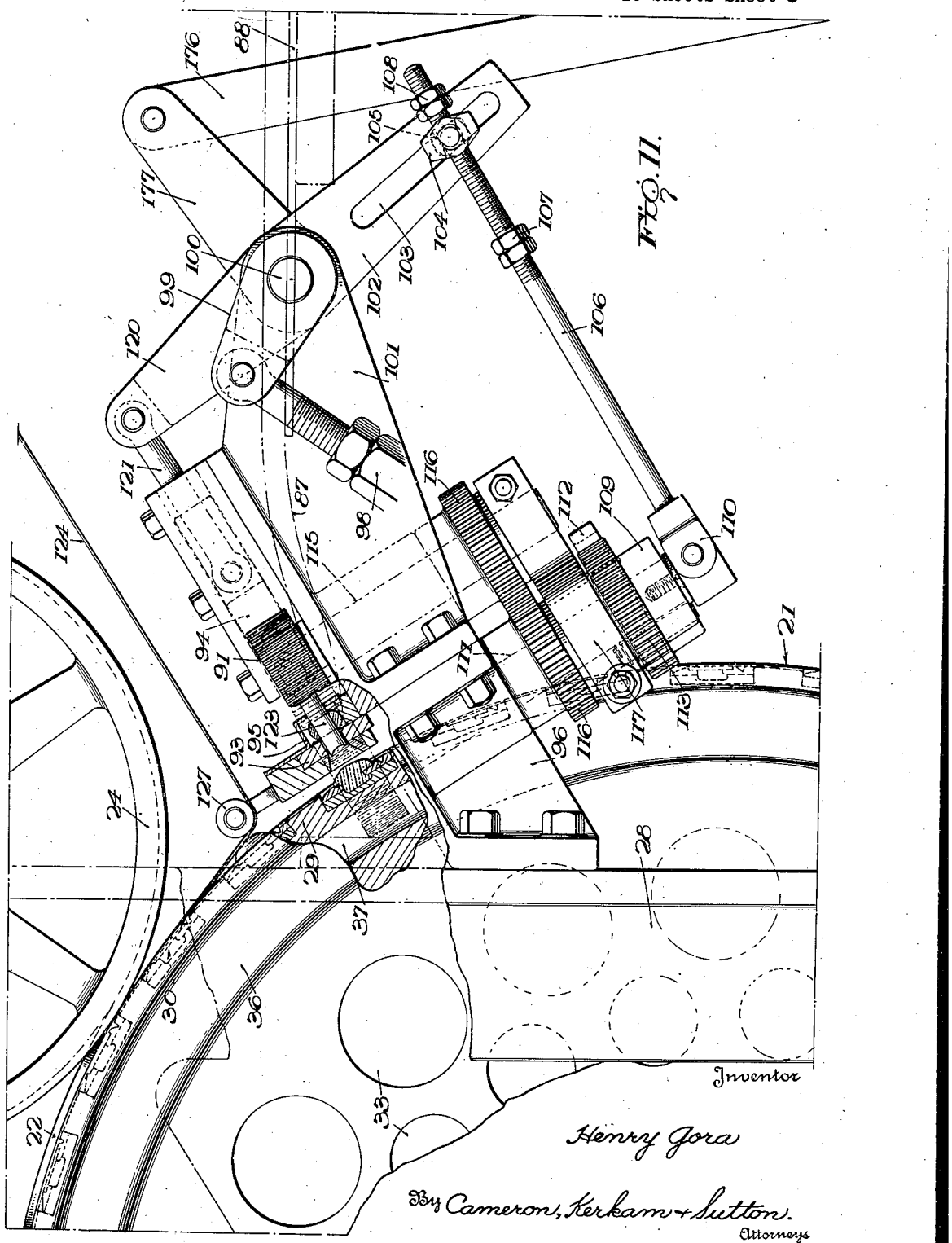

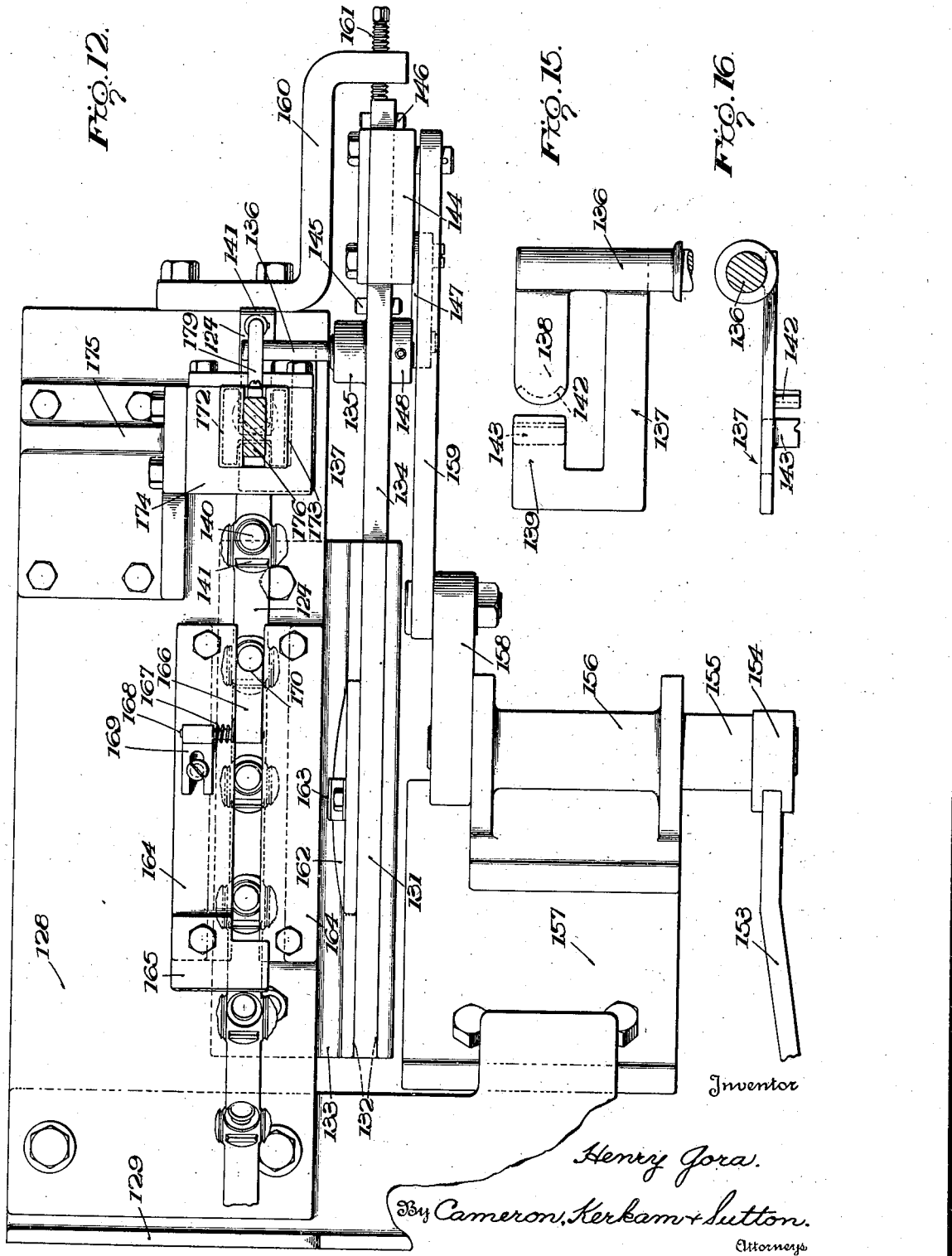

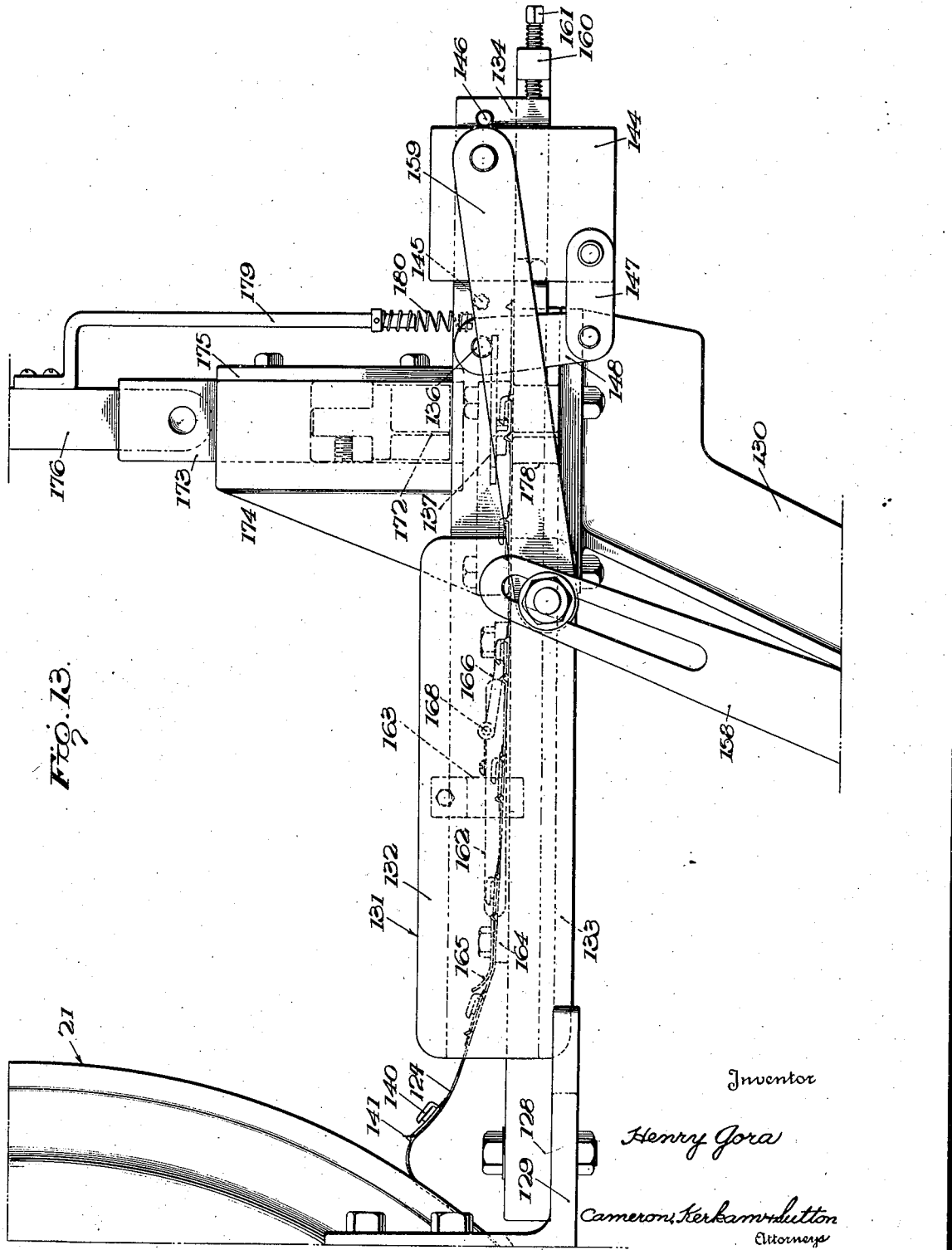

Patented July 18, 1939

2,166,490

UNITED STATES PATENT OFFICE 2,166,490

METHOD AND APPARATUS FOR MOLDING AND SECURING RUBBER OBJECTS TO FABRIC

Henry Gora, Bridgeport, Conn., assignor to Jenkins Bros., New York, N. Y., a corporation of New Jersey Application October 17, 1935, Serial No. 45,476

21 Claims. (Cl. 18—2)

This invention relates to apparatus and methods for molding and securing rubber objects to fabric, and more particularly to a machine and method for automatically manufacturing attaching elements for hose and other garment supporters of the type embodying a fabric strip or tab having a rubber button secured to one end thereof and a wedge-shaped member, also of rubber, at its other end for securing or locking the strip to the loop member of the supporter.

As will be seen from Fig. 18 of the accompanying drawings, one article to the manufacture of which the method and apparatus of the present invention is particularly well adapted consists of a strip or tab of cloth or similar fabric to one end of which is vulcanized a button of rubber or like material while at the other end it carries a transversely extending, wedge-shaped locking member or shoulder formed of the same material as the button and likewise vulcanized to the fabric. It has been proposed heretofore, as in the patent to Hawie, No. 1,426,636, to provide supporter elements of this same general construction using, however, a piece of rubber as the supporting web instead of a fabric strip as is now proposed. In making these all-rubber elements it has been the practice to mold each one separately as a solid, integral piece of rubber. While hose supporters of this construction have been fairly satisfactory, the rubber strips oftentimes lose their elasticity due to excessive or repeated stretching, and in many cases are actually torn apart, thereby becoming useless and necessitating replacement while the rest of the supporter is still serviceable. By using fabric instead of rubber for this portion of the supporter, this defect can be overcome and the service life of the article increased materially over that of the all-rubber element.

Difficulty has been experienced, however, in economically manufacturing elements such as hose supporters in which it is desired to secure rubber objects to supporting webs or strips of fabric. The use of metal connecting means is objectionable particularly in an article such as a garter because of the contact with the body. Sewing the parts together is likewise unsatisfactory because of the excess time and labor involved. It has therefore been suggested, as illustrated by the patent to White, No. 1,159,559, that the union between the rubber and the fabric supporting strip be effected by vulcanization. However, so far as is known, there has never before been provided any satisfactory method or machine for automatically manufacturing elements of this construction.

It is therefore one of the objects of this invention to provide both a novel method and a mechanism of new and useful construction for efficiently and economically molding articles of various kinds and shapes from rubber and securing said articles to supporting strips or tabs of fabric by vulcanization.

Another object is to provide a novel machine for automatically molding rubber elements for hose and other garment supporters, securing said elements by vulcanization to a continuous strip of fabric at spaced intervals therealong, and then cutting and trimming the resulting product so as to produce the individual hose attaching portions of said supporters.

A further object is to provide a method of making the hose attaching elements of garters which comprises a novel sequence of operations particularly well adapted to a continuous and rapid production.

Still another object is to provide an apparatus of improved construction for effecting the positive adherence of molded rubber articles to fabric such as cloth.

A still further object is to provide a novelly constructed mechanism for making composite articles of rubber and fabric in which the rubber and fabric are fed to the machine from separate sources and are treated in such a manner that the rubber is molded to the desired shape, cured and secured to the fabric and the resulting article is cut and trimmed in a rapid and completely automatic manner.

Another object is to provide a new and improved method and apparatus which will be capable of efficiently and economically manufacturing the hose attaching elements of garters on a practical production basis.

Generally speaking, the method of the present invention involves the molding of a plurality of elements, such as garter buttons and locking members, from uncured rubber and the securing of said elements to a strip of fabric at spaced intervals therealong by vulcanization, after which the fabric strip and its adhering elements are cut and trimmed in such a manner as to form the desired individual articles. The machine for carrying out this procedure, which is also part of the invention, may be described broadly as comprising a rotatable molding wheel in the periphery of which are located a plurality of circumferentially spaced molds adapted to form the buttons and locking members of garter elements of the type previously mentioned, means for loading charges of uncured rubber into said molds, means for feeding a strip of fabric on top of and in contact with the rubber in the molds, means for applying pressure and heat to the fabric and rubber to effect molding and curing of the rubber and attachment thereof to the fabric, and means for stripping the resulting product from the mold wheel and for cutting and trimming it into individual garter elements.

Although it is already known to vulcanize strips of rubber or rubberized fabric by drawing the strips over heated cylinders or rolls and simultaneously exerting pressure thereon by means of an overlying endless belt, the machines heretofore available are not suitable for present purposes since they do not embody feeding, loading, molding and cutting mechanisms which are capable of handling two different materials at the same time and producing therefrom individual articles of the desired composite character.

Consequently, it is still another object of the present invention to provide a machine for simultaneously molding rubber articles and securing them to fabric wherein there are combined with a peripheral molding wheel cooperating mechanisms of novel construction for feeding to the wheel the materials to be molded and secured together, for applying the molding and vulcanizing pressure and heat, and for stripping from the wheel, cutting and trimming to desired form the product resulting from the molding and vulcanizing operations.

These and other objects, including the provision of novel mechanism whereby the various driving, feeding, loading, molding, vulcanizing, stripping, cutting and trimming operations of a machine of the character described may be correlated and synchronized, will appear more fully upon a consideration of the detailed description of the embodiment of the invention which follows. Although only one particular form of machine is described and illustrated in the accompanying drawings, it is to be expressly understood that these drawings are for the purpose of illustration only and are not to be construed as defining the scope of the invention, reference being had for this purpose to the appended claims.

Referring now to the drawings, wherein like reference characters indicate like parts throughout the several views:

Fig. 1 is a side elevation of a machine for automatically manufacturing the hose attaching elements of garters representing one embodiment of the method and apparatus of the present invention;

Figs. 2 and 3 are plan and end elevation views, respectively, of the machine shown in Fig. 1;

Fig. 4 is an end elevation on an enlarged scale of a portion of the drive for the machine shown in Figs. 1–3 with certain elements shown in section;

Fig. 5 is a side elevation of the mold wheel of Figs. 1–4 and a section through certain of its associated elements taken approximately on the line 5—5 of Fig. 4;

Figs. 6 and 7 are plan and sectional views, respectively, of one of the belt adjusting pulleys of the machine shown in Figs. 1–3;

Figs. 8ª and 8ᵇ are plan views of the two portions of a mold adapted for use with the mold wheel shown in detail in Figs. 4 and 5;

Fig. 9 is a radial section through the periphery of the mold wheel taken substantially on line 9—9 of Fig. 5;

Figs. 10 and 11 are enlarged plan and elevation views, respectively, with certain parts shown in section, of the loading mechanism of the machine shown in Figs. 1–3;

Figs. 12, 13 and 14 are enlarged plan, side elevation and end elevation views, respectively, of the unloading, cutting and trimming mechanism of the machine shown in Figs. 1–3;

Figs. 15 and 16 are enlarged plan and elevation views, respectively, of the unloading carrier member of Figs. 12, 13 and 14;

Fig. 17 is an inverted perspective view of a cutting element adapted for use with the cutting and trimming mechanism of Figs. 12, 13 and 14;

Fig. 18 is a perspective view of one of the individual garter elements produced by the method and apparatus of the present invention;

Figs. 19 and 20 are plan and side elevation views, respectively, of a portion of the continuous fabric strip and its adhering molded rubber garter buttons and locking shoulders in the form in which it appears after being stripped from the molding wheel;

Fig. 21 is a fragmentary perspective view of a modified form of molding wheel adapted for the simultaneous production of a plurality of strips; and Fig. 22 is a sectional view through one of the mold carrying bars shown in Fig. 21.

Referring now to the drawings, the machine embodying the present invention disclosed therein may be said to comprise four principal groups of cooperating elements: first, an intermittently rotatable, peripheral molding wheel 21 around a substantial portion of the periphery of which passes an endless belt or band 22 preferably of metal, said belt being maintained under tension so as to exert a pressure against molding wheel 21 by its passage around grooved pulleys or rollers 23, 24 and 25 the positions of which are adjustable so as to vary the tension of the belt; second, an automatic loading or feeding mechanism, indicated generally at 26, located at a point slightly in advance of that at which molding wheel 21 passes beneath pulley 24 and belt 22, which delivers charges of uncured rubber to the molds carried in the periphery of molding wheel 21 and then brings a continuous strip of fabric into contact with the periphery of said wheel and the exposed surfaces of the rubber in said molds; third, an automatic unloading mechanism, indicated generally at 27, located at a point just beyond that at which belt 22 leaves the wheel 21 and passes around pulley 25, which strips or removes the continuous fabric strip with its adhering molded rubber buttons and locking shoulders from wheel 21; and fourth, a mechanism associated with the unloading mechanism which cuts and trims the fabric strip into individual garter elements each having a button at one end and a locking shoulder at the other. All four of these groups of elements, together with a common driving mechanism which includes means for correlating and synchronizing the action of all of the movable parts of the machine, are supported by a suitable framework 28.

In order to simplify the disclosure of the invention, each of the four main portions of the mechanism will be described separately as follows:

The molding wheel

As shown best in Figs. 4 and 5, molding wheel 21 is preferably provided with a cylindrical periphery 29 in which are formed at circumferentially spaced intervals recesses 30 adapted to receive molds of a character later to be described. The periphery 29 of wheel 21 is connected to a hollow elongated hub 31 by a suitable web 32 which may be provided with lightening openings 33, if desired. Hub 31 is rotatably supported in a suitable bearing block 34 which is adjustably supported in a saddle member 35, the latter in turn being mounted in any desired manner on framework 28.

The outer portion of web 32 of wheel 21 is enlarged as indicated at 36 so as to provide an annular heating chamber 37 extending entirely around the wheel just beneath the central portion of the periphery 29 in which mold recesses 30 are formed. Suitable means are then provided for supplying steam or other heating medium to chamber 37 so that sufficient heat may be transferred to the rubber within the molds to effect curing and adhesion thereof to the overlying strip of fabric by vulcanization during the rotation of the wheel. In the form shown, pipe connections 38 and 39, which are carried by and rotatable with wheel 21, are connected at their outer ends to annular chamber 37 on opposite sides of a partition 40 and serve as the inlet and outlet, respectively, for the heating medium. The opposite ends of pipe connections 38 and 39 pass outwardly through the ends of hub 31 and are connected to suitable supply and exhaust lines 41 and 42 through rotatable couplings or stuffing boxes 43 of any desired construction.

Pulleys 23, 24 and 25 (Fig. 1) are so located with respect to molding wheel 21 that the portion of belt 22 extending between pulleys 24 and 25 is maintained in contact with the periphery of wheel 21 throughout a substantial portion thereof, the extent of contact between the belt and wheel being such as to insure complete molding and vulcanization of the rubber contained in the molds of the wheel during the time required for rotation of the wheel through the distance corresponding to said extent of contact. In the embodiment illustrated, pulleys 24 and 25 are supported by means of bearing blocks 44 and 45 in such positions that they are substantially tangent to the periphery of wheel 21 at points approximately 120° apart, pulley 24 being adjacent the top of the wheel and pulley 25 adjacent the bottom thereof, a construction which brings belt 22 into contact with the wheel throughout approximately two-thirds of its circumference. Pulley 23 is supported in a position substantially equi-distant from pulleys 24 and 25 on the opposite side of wheel 21 therefrom and out of contact with the latter.

In order that the tension of belt 22, and the resultant pressure against the periphery of molding wheel 21, may be varied as desired, the position of pulley 23 is adjustable with respect to both pulleys 24 and 25 and wheel 21. As shown, pulley 23 is rotatably supported at the upper end of a lever 46 which is fulcrumed at 47 in an adjustable bearing block 48 slidably supported for movement toward and away from wheel 21 between a pair of bracket arms 49 which extend horizontally outwardly from a base plate 50 suitably secured to framework 28. The position of bearing block 48 may be adjusted by means of suitable set screws 51. In setting up the machine, the general slackness of belt 22 is taken up by adjustment of the position of bearing block 48 which effects a bodily movement of lever 46 and pulley 23. After bearing block 48 has been set in position and locked by set screws 51, the final or fine adjustment of the tension of belt 22 is made by movement of lever 46 about its fulcrum point 47. For this purpose, suitable means 52 of any desired construction are provided for applying a variable force to the bottom end of lever 46 acting to move said lever in a counterclockwise direction, as viewed in Fig. 1, about its fulcrum point 47 so as to move the axis of rotation of pulley 23 further away from pulleys 24 and 25 and thereby increase the tension in belt 22. In the preferred embodiment, force applying means 52 includes a suitable resilient member such as a spring 53 which may be combined with a scale of any desired construction for indicating the amount of force applied and the resultant tension in belt 22.

As previously pointed out, pulley 24 is substantially tangent to the periphery of molding wheel 21, the result being that this pulley exerts a positive force against the periphery of the wheel through the medium of belt 22. The pressure thus exerted by pulley 24 constitutes the real molding pressure which forces the rubber supplied to the molding wheel by loading mechanism 26 to completely fill the molds carried thereby, it being the function of belt 22 to continue or maintain a molding pressure during the time that wheel 21 rotates through approximately 240°, the time that the rubber remains in the molds for curing and adhesion to the fabric strip.

In order that the molding pressure exerted by pulley 24 may be adjusted to any desired amount, means are provided for varying the distance between the axis of rotation of said pulley and that of wheel 21 without affecting to any material extent the tension of and pressure exerted by belt 22. As shown best in Figs. 6 and 7, pulley 24 is rotatably mounted on a stub shaft 54 which is secured to, but eccentrically offset from the axis of, a slightly larger stub shaft 55 which is in turn normally tightly clamped between the upper and lower halves of a bearing block 44 as by studs 56. The lower half of bearing block 44 is secured to a saddle member 57 by studs 58, the latter passing through holes 59 in said block which are elongated in a direction at right angles to the axis of stub shaft 55. Saddle member 57, which may be suitably supported by framework 28, is then provided with adjustable set screws 60 which engage the opposite ends of the lower half of block 44 and not only assist studs 58 in holding said block rigidly in position but are also adapted to move the bearing block for purposes of belt alignment in a direction approximately perpendicular to the line joining the axes of stub shaft 55 and hub 31 of wheel 21 when studs 58 are loosened. Set screws 60 are preferably staggered with respect to one another so as to balance the couple set up in the pulley bearing structure by the eccentric arrangement of the stub shafts.

By loosening studs 56 which hold the upper half of block 44 to the lower half and normally clamp stub shaft 55 in non-rotatable position, and applying a wrench to the hexagonal end of stub shaft 55, the latter and its eccentrically mounted stub shaft 54 may be rotated within the bearing so as to bring the axis of stub shaft 54 and its pulley 24 closer to or further from wheel 21. The molding pressure exerted by pulley 24 upon the rubber in the molds of wheel 21 can thus be regulated as desired. Any slack which may be created in belt 22 by this adjustment of pulley 24 is automatically taken up by spring 53 of force applying means 52 associated with pulley 23.

The construction of bearing block 45 and the associated elements providing the support for pulley 25 is preferably the same as that just described in connection with block 44 and pulley 24, although it will be understood that there is no necessity for any pressure, variable or otherwise, by pulley 25 against molding wheel 21; instead, the adjustability of the mounting of this pulley is utilized only for ease in assembling the machine and in initially adjusting belt 22 about the molding wheel, a result to which the adjustable mounting of pulley 24 also contributes. For example, since belt 22 is endless, its assembly in the machine must be accomplished by passing it laterally between the peripheries of molding wheel 21 and pulleys 24 and 25. By releasing the studs 56 of bearing blocks 44 and 45, these pulleys may be moved away from wheel 21 sufficiently to permit the insertion of belt 22, after which the pulleys are returned to and secured in their proper positions before final tensioning of the belt by means of pulley 23.

As previously mentioned, molding wheel 21 is adapted to be rotated intermittenly so that the rubber and fabric which are utilized in making the individual garter elements produced by the machine may be easily supplied to and removed from the wheel and the necessary molding, curing, securing, cutting and trimming operations may be readily carried out in properly timed relation to one another. However, it will be understood that by suitable changes in the mechanical movements of the elements, the rotation of the molding wheel might be made continuous instead of intermittent.

In the embodiment shown, the source of driving power for all of the elements of the machine is an electric motor 61 which may be mounted in any desired manner as on a table 62 secured to framework 28. The shaft of motor 61 is preferably connected through a clutch 63 to a speed reduction mechanism 64 of any suitable construction, which mechanism is drivingly connected to and continuously rotates a sprocket wheel 65 through the medium of a suitable driving chain 66. The direction of rotation of sprocket wheel 65 is counterclockwise as viewed in Fig. 1. The shaft 67 of sprocket wheel 65, which may be denominated the main timing shaft of the entire machine, is rotatably journalled in a suitable bearing 68 carried by a supporting bracket 69 which is in turn mounted on table 62. Secured to sprocket wheel 65, as by bolts 70, and concentric therewith, is an annular plate 71 (Figs. 1-4) which carries a laterally projecting roller 72, this roller being so positioned that once in every revolution of sprocket wheel 65 and plate 71 it engages one of the open slots 73 of a Geneva gear 74 mounted on a shaft 75, the latter also being journalled in supporting bracket 69. Plate 71 is also provided with the usual circular boss 76 the surface of which concentric with plate 71 engages the concave surface of Geneva gear 74 between each pair of slots 73 so as to prevent the gear from rotating except when driven by roller 72, boss 76 being cut away at 77 to provide a clearance space for the projecting arms of the Geneva gear when the latter is rotated by roller 72.

Shaft 75 of Geneva gear 74 also has secured thereto a pinion 78 which meshes with and intermittently drives a gear 79 secured to the hub 31 of molding wheel 21. With this construction, the continuous counterclockwise rotation of sprocket wheel 65 and its timing shaft 67 is converted, through the medium of Geneva gear 74 and its associated driving mechanism, into intermittent counterclockwise movement of molding wheel 21, the dimensions of the parts and the gear ratios being so selected that each actuation of the molding wheel moves it through a distance equal to that between successive mold recesses 30. Since belt 22 is maintained in contact with the periphery of wheel 21 under substantial tension, it engages the wheel with considerable pressure and thereby creates sufficient friction that rotation of the wheel carries with it belt 22 and moves the latter around its pulleys 23, 24 and 25 without the necessity for any positive drive thereof.

Referring now to the molds which are carried in recesses 30 of wheel 21, each mold is so constructed as to form both a garter button and a wedge-shaped locking shoulder as an integral unit, the button and locking shoulder remaining integral with one another during the entire vulcanizing treatment and until the individual garter elements are formed by operation of the cutting and trimming means later to be described. As shown best in Figs. 8ª, 8ᵇ and 9, each mold is made in two parts 80 and 81 which are superposed one over the other in a recess 30 and are secured in place in any suitable manner as by screws 82. The inner or lower mold member 80 is provided with a substantially cup-shaped cavity 83 which is adapted to form the head of a garter button. The upper or outer mold member 81 is provided with a cavity of more complex shape, the portion 84, wich connects with cavity 83 in the lower mold member being shaped to form the shank of a garter button, notch-shaped portion 85 forming a locking shoulder, and portion 86, which is substantially annular in shape, serving to provide a base for the button. Grooves 86', spaced apart a distance slightly greater than the width of the fabric strip, may be provided to receive the major portion of the excess rubber which is loaded into the mold. The entire surface of mold member 81 between grooves 86' is adapted to be covered by rubber, this rubber serving both to join the button and locking shoulder into an integral unit and, since it is also the part which lies in contact with the fabric strip, to unite the integrally formed button and locking shoulder to the strip through vulcanization.

*The feeding and loading mechanism*

The novel mechanism which has been provided for feeding the rubber and fabric to the mold wheel and for loading the rubber in the molds and bringing the fabric into contact therewith is best illustrated in Figs. 10 and 11. As there shown, the stock of uncured rubber from which successive charges are cut and loaded into the molds of mold wheel 21 is supported in the form of a coiled strip 87, which may be round or of any desired cross section, on a suitable pan or table 88 in a position adjacent the loading mechanism 26. In order that the height of pan 88 may be adjusted to proper feeding position, it is mounted on the top of a rod or post 89 which is vertically slidable at its lower end within a supporting standard 90.

From the coil on pan 88, the rubber passes to a pair of knurled feed rollers 91 and 92 which engage the strip 87 and advance it in a direction substantially parallel to the axis of rotation of wheel 21 until it reaches a loading position between a die 93 and a loading plunger 94. A suitable guide 95 may be provided for directing the rubber into proper position with respect to die 93 and plunger 94. Feed rollers 91 and 92, die 93 and loading plunger 94 are all supported in operative position by a bracket 96 secured to framework 28, said die and plunger being so located that they are in line with one of the positions in which the successive molds of molding wheel 21 come to rest.

In order that the movements of feed rollers 91 and 92 and loading plunger 94 may be properly correlated with one another and with the movement of wheel 21, common means have been provided for controlling the actuation of these elements in timed relation to the intermittent rotation of the molding wheel. As shown, timing shaft 67, which is continuously rotated by sprocket wheel 65, is provided with an eccentric 97 driving a connecting rod 98 the upper end of which is secured to a crank arm 99 fixedly mounted on one end of a horizontal shaft 100. Shaft 100 is rotatably supported adjacent its ends in suitable bearings formed in arms 101 which extend outwardly from bracket 96. Secured to shaft 100 intermediate its ends is a downwardly depending lever 102 having an elongated slot 103 formed therein adapted to receive a bolt 104 which can thus be secured to the lever in any desired position therealong. The head of bolt 104 is provided with a chamfered hole 105 through which passes one end of a rod 106. The extent of movement of lever 102 and bolt 104 relative to rod 106 is determined by the positions of lock nuts 107 and 108 which are threaded onto rod 106 on opposite sides of the head of bolt 104.

The other end of rod 106 is connected to a lever 109 through a swivel joint 110, said lever 109 being rotatably mounted on the lower end of a shaft 111 which may be supported in a suitable bearing carried by bracket 96 with its axis in a position substantially at right angles to the axis of shaft 100 and to the axis or line of alignment of die 93 and loading plunger 94. Lever 109 also carries a pawl 112 which is normally urged into engagement with the teeth of a ratchet wheel 113 by a spring 114, ratchet 113 being secured to shaft 111. As shown best in Fig. 10, pawl 112 and ratchet wheel 113 are so constructed that when rod 106 is moved to the left, as viewed in Fig. 11, by engagement of the head of bolt 104 with lock nut 107 upon oscillation of shaft 100 and lever 102 in a clockwise direction, pawl 112 engages ratchet 113 and rotates the latter together with its shaft 111 in a counterclockwise direction. Movement of rod 106 in the opposite direction, due to the engagement of the head of bolt 104 with lock nut 108 when lever 102 and shaft 100 are oscillated in a counterclockwise direction, produces no rotational movement of ratchet 113 and shaft 111 since pawl 112 is so formed as to pass freely over the teeth of ratchet 113 when moved in this direction.

Secured to the upper end of and intermittently rotatable with shaft 111 is one of feed rollers 91, 92 which advance the unvulcanized rubber stock to loading position, the other of said rollers being mounted on the upper end of a shaft 115 which is also journalled in a suitable bearing carried by bracket 96 and is rotated in synchronism with shaft 111 through a pair of gears 116 which drivingly connect these two shafts. In order to prevent any backlash movement of gears 116, shafts 111 and 115, and feed rollers 91 and 92 when pawl 112 is moved in a clockwise direction, a friction brake 117 may be provided to engage the lower ends of shafts 111 and 115, the tension of which brake may be regulated in any desired manner as by the cooperation of a nut 118 and spring 119.

Through the driving mechanism just described feed rollers 91 and 92 are intermittently rotated once during every rotation of main timing shaft 67 so as to advance the uncured rubber stock in strip-like form to the loading position in line with die 93. After the rubber strip 87 comes to rest in this position, the loading plunger 94, actuated by the mechanism next to be described, severs a piece of rubber from the strip and forces it through die 93 and into one of the molds of wheel 21 which is then at rest in a position directly in line with the die and plunger.

In order that the loading movement of plunger 94 may be synchronized with that of feed rollers 91 and 92 and the means which rotate molding wheel 21, the movement of plunger 94 is also derived from main timing shaft 67 through connecting rod 98 and shaft 100. As shown, shaft 100 has secured thereto, adjacent the end opposite that to which connecting rod 98 is connected, an upwardly extending lever 120 the upper end of which is connected to plunger 94 by means of a link 121. Oscillation of shaft 100 and lever 120 thus moves plunger 94 toward and away from die 93 and the periphery of molding wheel 21, said plunger being guided in its movements by a suitable housing 122 through which it slides and which is secured to bracket 96. The inner end of plunger 94 carries a replaceable pin 123 the forward end of which is recessed and sharpened on the edges to facilitate severing of the charges of rubber from strip 87 and forcing of the charges through die 93 and into the molds in the periphery of wheel 21.

Since lever 120 which actuates loading plunger 94 extends in an approximately diametrically opposite direction from lever 102 which drives feed rollers 91 and 92, and since there is a certain amount of lost motion between lever 102 and rod 106 due to the form of the connection therebetween and the locations of lock nuts 107 and 108, it will be understood that the charging movement of plunger 94 and pin 123 takes place while feed rollers 91 and 92 are at rest, and that during the time that said rollers are advancing the rubber strip 87 for the next charging operation pin 123 has already been withdrawn to the right, as viewed in Fig. 11, beyond the line of feed of said strip.

The fabric to which the objects molded from the rubber thus loaded in the molds of wheel 21 are to be secured is introduced between belt 22 and the periphery of wheel 21, and thus brought into contact with the exposed surfaces of the rubber in the molds, at a point just beyond the rubber loading station. As shown best in Figs. 1, 5 and 11, the fabric is supplied in the form of a continuous strip 124 from a roll 125 which is rotatably supported above the rubber loading mechanism 26 by a suitable arm or bracket 126, said arm being secured to the framework 28 in any suitable manner, as by attachment to the lower half of bearing block 44 by means of studs 56. From roll 125 the fabric strip 124 passes downwardly toward the periphery of molding wheel 21 and around a guide roller 127 which may be mounted in suitable position on supporting bracket 96 of the rubber loading mechanism. From guide roller 127 the fabric strip is led forward beneath pulley 24 until it passes between belt 22 and the periphery of molding wheel 21, at which time it is forced tightly against the periphery of the wheel and into contact with the exposed surfaces of the rubber in the molds by the pressure of pulley 24.

During the rotation of wheel 21 from the point at which belt 22 first comes into contact therewith beneath pulley 24 until the belt leaves the wheel and passes around pulley 25, the fabric strip 124 is held tightly against the periphery of the wheel and in contact with the rubber in the molds under a constant pressure exerted by belt 22. During this time the rubber in the molds is molded to the desired shape, cured and secured to strip 124 by vulcanization due to the heat transmitted to the rubber from the heating medium which continuously flows through annular heating chamber 37 of the wheel. As previously pointed out, the time required for rotation of wheel 21 from pulley 24 to pulley 25 is such as to permit completion of the curing and vulcanizing operation. Consequently, when any particular point on the molding wheel passes pulley 25 and the belt 22 leaves the wheel, the rubber objects in the mold at that point are completely cured and secured to the fabric strip 124, and the fabric and its adhering rubber objects are ready to be stripped from the wheel for the finishing cutting and trimming operations.

The unloading mechanism

The fabric strip and its adhering molded rubber objects, garter button and locking shoulders in the embodiment illustrated, are stripped or peeled from molding wheel 21 and moved to a cutting and trimming station by the mechanism indicated generally at 27, the details of which are shown best in Figs. 12–16. Generally speaking, the unloading mechanism comprises a reciprocable member which is movable toward and away from the periphery of mold wheel 21 and is provided with a carrier of such construction as to engage one of the molded rubber objects secured to the fabric strip and to pull the strip away from the wheel and advance the portion already separated therefrom to a position in registration with the cutting and trimming mechanism later to be described.

Referring now to Figs. 12–14, both the unloading and the cutting and trimming mechanisms are supported by a substantially rectangular, horizontal table member 128 which extends outwardly from a position closely adjacent the periphery of wheel 21 just above pulley 25, said member also providing a surface over which the fabric strip 124 is drawn by the unloading mechanism. Table member 128 is supported at its inner end by a suitable bracket 129 secured to framework 28 and at its outer end by a strut or brace 130 which is also fastened to said framework.

Positioned to one side of table member 128, and parallel to the plane of wheel 21, is an elongated guide member 131 having two parallel vertical walls 132 and a bottom wall 133 which extends laterally beyond one of vertical walls 132 and beneath table member 128, thereby providing a means for supporting the guide member 131 from said table member. The space or channel defined by vertical walls 132 and bottom wall 133 constitutes a way for an elongated main slide 134 the end of which furthest away from wheel 21 extends outwardly beyond the end of guide 131 and carries the elements of the unloading mechanism which engage and move the fabric strip 124 and its adhering rubber objects to cutting position.

As shown, the outwardly projecting portion of main slide 134 is provided intermediate its ends with a suitable bearing boss 135 in which is journalled a stub shaft 136 having its axis at right angles to the length of slide 134. One end of stub shaft 136 extends laterally over table member 128 and has secured thereto, in a position substantially coplanar with molding wheel 21, a carrier member 137. As shown best in Figs. 15 and 16, carrier member 137 is provided with a pair of fingers 138 and 139 the ends of which are separated by a relatively short distance only slightly greater than the width of the cutting or shearing element later to be described, which element, in the embodiment of the invention illustrated, severs each garter button 140 from its integrally molded locking shoulder 141 (see Figs. 19 and 20), trims off any excess rubber 171, and cuts the continuous fabric strip 124 into individual garter elements. Finger 138, the end of which is curved to conform to the shape which it is desired to impart to the button end of each garter element, is provided with a downwardly depending, arcuate lug 142 so shaped that, when carrier member 137 is in horizontal position, the inner curved surface thereof engages that edge of a garter button 140 which is adjacent its integrally molded locking shoulder 141 in such a manner that, if main slide 134 is then moved away from the molding wheel, or to the right as viewed in Fig. 13, the fabric strip 124 and its adhering molded rubber buttons 140 and locking shoulders 141 will be drawn away from the molding wheel. To assist in this operation, the end of finger 139, which is squared to conform to the shape of the locking shoulder end of each garter element, may be provided with a downwardly depending lug 143 of such shape and size as to similarly engage a locking shoulder 141, although it will be understood that engagement of the locking shoulder is not at all essential to the operation of the unloading means. Both fingers 138 and 139 and lugs 142 and 143 are so constructed as to cover and protect the garter buttons and locking shoulders during the cutting and trimming operation.

Although in unloading the fabric strip and its adhering molded rubber garter buttons from the molding wheel it is necessary for the head of each button to pass through the shank portion of its mold which is smaller in diameter than the head, it has been found in practice that the rubber of the molded button is at this time still warm and sufficiently resilient to permit stripping out of the mold without distortion of its shape, particularly when the stripping action is relatively rapid as in the case of the mechanism disclosed.

In order that the movement of carrier 137 may be correlated and synchronized with the other elements of the machine, novel means are provided for actuating said carrier in timed relation to the movements of molding wheel 21. In the form shown, main slide 134 has mounted on the outer end thereof a block 144 which surrounds and is slidable along said slide through a distance defined by stop pins 145 and 146, pin 145 limiting the movement of block 144 relative to slide 134 in a direction toward the molding wheel while pin 146 limits said movement in the opposite direction. This relative movement between block 144 and slide 134 is provided for the purpose of rotating stub shaft 136 within its bearing 135 so as to lower and raise carrier member 137 into and out of engagement with the garter buttons 140 and locking shoulders 141 of the fabric strip 124 as it comes from the molding wheel. To this end, block 144 has pivotally connected thereto one end of a forwardly extending link 147 the other end of which is pivotally connected to the outer end of a lever 148 which is secured to stub shaft 136.

The movement of block 144, which by its engagement with stop pins 145 and 146 also produces movement of main slide 144, is derived from Geneva gear 74 through the following mechanism. Secured to the shaft 75 of Geneva gear 74, or preferably fastened directly to the latter, is a gear 149 which meshes with and drives a smaller gear 150 mounted on a shaft 151, the latter being suitably journalled in a bearing block 152 secured to supporting bracket 69. In the particular machine disclosed, the gear ratio between gears 149 and 150 is four to one. Eccentrically connected to the shaft 151 of gear 150 is one end of a connecting rod 153 the other end of which is pivotally secured to the lower end of a lever 154 having its upper end secured to a stub shaft 155. Stub shaft 155 is rotatably supported in a suitable bearing 156 which may be mounted on a bracket 157 secured at its upper end to the saddle member in which the bearing block 45 of pulley 25 is housed. The end of stub shaft 155 closest to the plane of molding wheel 21 has secured thereto the lower end of a lever 158 the upper end of which has an adjustable pin and slot connection with one end of a link 159 the opposite end of which is pivotally secured to block 144.

With this construction, during each quarter rotation of Geneva gear 74, which rotates molding wheel 21 through a distance equal to that between successive molds, gear 150 makes a complete revolution and, through the link and lever connections described, moves block 144, main slide 134 and carrier member 137 from their at rest positions shown in Fig. 13, which they occupy during the cutting and trimming operation, inwardly toward the mold wheel so as to engage an unsevered portion of the fabric strip 124 and then outwardly again to remove another section of the fabric strip and its adhering molded rubber buttons and locking shoulders from wheel 21 and to advance the same to cutting and trimming position. From the at rest position of the elements, the initial movement of block 144 to the left, as viewed in Fig. 13, is relative to main slide 134 and serves simply to tilt carrier member 137 upwardly through the medium of link 147, lever 148 and shaft 136 to a position in which lugs 142 and 143 are above the level of the tops of garter buttons 140 as the fabric strip 124 lies on table member 128. As soon as block 144 comes into engagement with stop pin 145, continued movement of said block inwardly toward the mold wheel carries with it main slide 144 and carrier member 137. When the inward movement of block 144 is completed, as determined by the position of the point of eccentric connection between connecting rod 153 and gear 150, carrier member 137 lies directly above another garter button 140 and locking shoulder 141. Consequently, when block 144 commences its outward movement in the opposite direction, which movement is relative to main slide 134 until the block engages stop pin 146, stub shaft 136 of carrier member 137 is first rocked so as to lower said carrier member and bring lugs 142 and 143 into engagement with the garter button and locking shoulder. Continued movement of block 144 and slide 134 then moves the unsevered portion of fabric strip 124 outwardly away from molding wheel 21 until the rotation of gear 150 is completed when Geneva gear 74 and the rest of the elements of the mechanism again come to rest.

The pin and slot connection between lever 158 and link 159 permits adjustment of the at rest position of block 144, main slide 134 and carrier member 137 so that these elements may be properly aligned with the cutting and trimming mechanism next to be described. In order to assist in fixing this at rest position of main slide 134 and its associated elements, a suitable bracket 160 may be secured to the outer end of table member 128 and provided with an adjustable stop member 161 positioned in line with the end of slide 134. For the purpose of preventing undesired movement of main slide 134 during the times that block 144 is moving relatively thereto between stop pins 145 and 146, one of the vertical walls 132 of guide member 131 may be provided with a suitable opening housing an elongated friction bar 162 which is yieldingly urged into frictional engagement with the side of slide 134, as by a blade spring 163.

To assist in guiding the fabric strip and its adhering rubber buttons and locking shoulders as it is stripped from molding wheel 21 and moved to the cutting and trimming position by the mechanism just described, table member 128 may have secured to its upper surface, intermediate its inner edge and the cutting and trimming station, a pair of guide blocks 164 which are spaced apart sufficiently to permit the passage of the tops of the garter buttons therebetween but undercut so as to overlie the side edges of the fabric strip. Secured to the inner end of one of guide blocks 164 there may also be provided guide plate 165 of resilient construction under the upturned end of which the fabric strip passes as it comes from the molding wheel, while toward the outer end of said guide blocks there may be located a tension finger 166 which extends downwardly between blocks 164 and exerts a yielding pressure tending to hold the strip flatly on the surface of table member 128. The tension of finger 166 is derived from a suitable spring 167 which tends to rotate said finger about its supporting shaft 168, the latter being adjustably secured to the top of one of guide blocks 164 by a suitable bifurcated member 169. The end of tension finger 166 may be curved as indicated at 170 to facilitate the passage therebeneath of the garter buttons.

*The cutting and trimming mechanism*

As the continuous fabric strip 124 is stripped from molding wheel 21 and moved to the cutting and trimming station in the manner previously described, each garter button 140 and the adjacent locking member 141 are integrally united by the rubber which occupied a portion of the cavity 86 of upper mold member 81. There is also often an overflow of rubber beyond the edges of the fabric strip, as indicated at 171 in Fig. 19, which must be trimmed off when forming the individual garter elements. Accordingly, the invention also includes a cutting and trimming mechanism which simultaneously severs each button 140 from its integrally molded locking shoulder 141, cuts the fabric strip at the point of severance between button and locking shoulder, and trims off any excess rubber which may adhere to the strip.

As shown, a cutting and trimming element 172 (see Fig. 17), which is so shaped as to simultaneously perform all of the cutting and trimming operations just mentioned, is removably secured to the lower end of a plunger 173 which is vertically reciprocable within a suitable guide block 174 supported in proper position above table member 128 by a bracket 175. In order that cutting and trimming element 172 may maintain its proper position during repeated operations, plunger 173 and the passageway through guide block 174 are preferably made rectangular in cross section so that there can be no movement of the plunger about a vertical axis which might turn cutting and trimming element 172 out of its proper position.

Plunger 173 and its cutting and trimming element 172 are given a vertical reciprocation in timed relation to the operation of the other elements of the machine by means of a vertically extending connecting link 176 which is connected at its lower end to plunger 173 and at its upper end to a lever 177 secured to shaft 100 of the loading mechanism 26 closely adjacent lever 120 which actuates loading plunger 94. As has previously been described, shaft 100 is continuously oscillated by means of connecting rod 98 and its eccentric connection 97 to main timing shaft 67. The eccentric 97 is so arranged that the last part of the downward or cutting stroke of plunger 173 and cutting and trimming element 172 takes place just after the molding wheel 21 and the unloading mechanism are brought to rest in the positions indicated in Fig. 13.

In order to facilitate the cutting and trimming operation and the disposal of the excess fabric and rubber which is cut and trimmed from the finished garter elements, the table member 128 may be provided with suitable vertical grooves or openings 178 therein of suitable size and shape to receive the solid portions of cutting and trimming element 172. Means may also be provided for engaging the portion of the fabric strip which is being severed from the main body thereof so as to maintain the strip under tension during the cutting and trimming operation. To this end, a vertical rod 179 may be secured to connecting link 176, or to plunger 173, if desired, on the side thereof opposite that towards the molding wheel 21, said rod carrying on its lower end a spring 180 which is adapted to engage and be compressed against the upper surface of the fabric strip beyond the line of cut so as to hold the same tightly against the surface of table member 128 during the cutting and trimming operation.

Operation

Although it is believed that the mode of operation of the machine of the present invention will be apparent from the preceding disclosure, the sequence of operations may be summarized as follows.

Assuming that the machine has been prepared for operation by tensioning belt 22 to the proper degree, first by adjustment of bearing block 48 and then by movement of lever 46 about its fulcrum 47 by means of force applying means 52, and by adjusting the position of pulley 24 with respect to molding wheel 21 in the manner previously described so as to provide the desired molding pressure, the end of fabric strip 124 is first led around guide roller 127 and introduced between belt 22 and the periphery of wheel 21 while the end of strip 87 of the uncured rubber stock coiled on pan 88 is placed between feed rollers 91 and 92. Steam or other suitable heating medium is then supplied to annular heating chamber 37 through supply line 41 and pipe connection 38, exhausting therefrom after passing entirely around the wheel through pipe connection 39 and exhaust line 42. Assuming that each of recesses 30 of molding wheel 21 contains molds of the form shown in Figs. 8a, 8b and 9, the machine is now ready for the automatic formation of individual garter elements of the form shown in Fig. 18 each having a molded rubber garter button and a locking shoulder secured by vulcanization to the opposite ends of a strip of fabric.

Main timing shaft 67 is then set in operation and continuously driven by motor 61 through clutch 63, speed reduction mechanism 64 and the chain drive to sprocket wheel 65. Once in every rotation of shaft 67 molding wheel 21 is moved through a distance equal to that between successive molds, the intermittent drive of said wheel being transmitted thereto through Geneva gear 74 and its associated mechanism. Each time that molding wheel 21 comes to rest, one of the molds lies in direct alignment with die 93 and loading plunger 94.

During the time that molding wheel 21 is being moved—that is, during the first quarter revolution of sprocket wheel 65 and timing shaft 67 from the position shown in Fig. 1—shaft 100 and levers 102, 120 and 177 (operating the feed rollers 91 and 92, loading plunger 94 and cutting and trimming element 172, respectively) are moved from the positions indicated in Fig. 1 in a clockwise direction through the medium of connecting rod 98 and eccentric 97. These movements of the levers in turn take up the lost movement between lever 102 and rod 106 and begin movement of the latter to the left so as to rotate feeding rolls 91 and 92, move loading plunger 94 and its pin 123 outwardly away from the molding wheel through a distance equal to half of their total travel on the return stroke, and lower cutting and trimming element 172 from a point adjacent the beginning of its cutting stroke to a position in which it is just clear of the top of the molded garter buttons.

During this same first quarter revolution of sprocket wheel 65 and timing shaft 67, the unloading mechanism makes a complete cycle due to the fact that gear 150 makes a whole revolution during a quarter revolution of the Geneva gear 74. Starting from the position shown in Fig. 1, the first portion of the revolution of gear 150 produces a movement of block 144 to the left relative to main slide 134 and elevates carrier member 137 so that the lugs 142 and 143 of fingers 138 and 139 are lifted out of engagement with the garter button and locking shoulder which have been severed from one another on the preceding cutting stroke. When block 144 engages stop pin 145 continued rotation of gear 150 moves block 144, slide 134 and carrier member 137 inwardly toward the molding wheel as a unit until, at the end of the first half revolution of gear 150, the carrier member is in a position overhanging the next integrally formed button and locking shoulder. The first portion of the second half revolution of gear 150 then slides block 144 rearwardly relative to main slide 134 until it engages stop pin 146, a movement which lowers carrier member 137 to a position in which the underlying garter button and locking shoulder are engaged by lugs 142 and 143. The remainder of the second half revolution of gear 150 produces a return movement of block 144, slide 134 and carrier member 137 to the cutting position, during which movement the continuous fabric strip 124 and its adhering buttons and locking shoulders are pulled away from molding wheel 21 and advanced to a position in which the button and locking shoulder engaged by carrier member 137 are brought to rest directly beneath cutting and trimming elements 172. During the next three quarters of the revolution of sprocket wheel 65 and timing shaft 67, the unloading mechanism, like molding wheel 21, remains at rest.

The rubber loading and the cutting and trimming mechanisms, however, continue their cycles after the molding wheel and the unloading mechanism complete their movements. For example, the second quarter revolution of timing shaft 67, after the molding wheel comes to rest, produces the final portion of the outward movement of plunger 94 and its pin 123, and also completes the movement of rod 106 inwardly to its extreme left hand position, as viewed in Fig. 1, thereby finishing the feed of rubber strip 87 to the loading position in line with die 93. At the same time, lever 177 moves cutting and trimming element 172 through the final portion of its cutting stroke during which it cuts and trims an individual garter element from the continuous strip which has been removed from the molding wheel by the unloading mechanism as previously described. During the last portion of this second quarter revolution of timing shaft 67, the direction of movement of connecting rod 98 is reversed and the counterclockwise oscillation of shaft 100 and its associated levers begins, thereby reversing the directions of movement of the loading and cutting mechanism.

The next, or third, quarter revolution of the timing shaft continues the loading stroke of loading plunger 94 and pin 123 and the upward or return stroke of cutting and trimming element 172. During this same time lever 102 is oscillated in a counterclockwise direction and, after taking up the lost motion, moves rod 106 outwardly to the right, thereby returning pawl 112 to its original position relative to ratchet 113 while feed rollers 91 and 92 remain at rest.

The next and final quarter revolution of the timing shaft results in completion of the loading stroke of loading plunger 94 and pin 123, whereby a charge of rubber is severed from strip 87 and forced through die 93 into the mold which then lies opposite said die, and of the return strokes (to the right and upwardly, respectively) of rod 106 and cutting and trimming element 172. During the last part of this final quarter revolution, the directions of movement of connecting rod 98, shaft 100 and the levers associated therewith are again reversed, thereby commencing the withdrawal stroke of the loading plunger and the cutting stroke of the element 172. The loading pin 123 is moved clear of the mold wheel just before this quarter revolution of timing shaft 67 ends so that the wheel is free to make its next intermittent movement as soon as roller 72 enters the open slot 73 of the Geneva gear 74 as previously described.

After each mold has been loaded with its charge of uncured rubber, the next few intermittent movements of molding wheel 21 bring the mold and its charge first beneath fabric strip 124 which leads from guide roller 127 to its point of contact with the periphery of the wheel and then beneath belt 22 as the latter passes beneath pulley 24. At this point, namely, the point of initial contact between belt 22 and the periphery of the molding wheel, the principal molding pressure is exerted on the rubber by pulley 24 through the medium of belt 22 and the fabric strip and forces the rubber to completely fill the mold. During movement of the molding wheel from this point to the point approximately 240° distant where the belt 22 leaves the periphery of the wheel, said belt exerts a substantially constant pressure against the fabric strip forcing the latter into contact with the exposed surface of the rubber in the mold and maintaining a molding pressure on the rubber. At the same time, the heat transmitted to the rubber from heating chamber 37 effects curing thereof in the molded form and adhesion to the fabric strip through vulcanization. As a result, when each mold reaches the point at which belt 22 leaves the periphery of the molding wheel, the rubber within the mold is completely cured and securely fastened to the fabric strip.

The cycle thus described is repeated automatically due to the continuous rotation of timing shaft 67, the result being that the individual garter elements are rapidly and efficiently produced one after another with little or no manual attention.

There is thus provided by the present invention both a novel method and a new and useful apparatus for automatically molding objects from uncured rubber or like material, securing them to a strip of cloth or similar fabric by vulcanization, and cutting the product thus formed into individual elements each having the molded objects secured to a piece of the fabric at desired locations. The invention is particularly well adapted to the manufacture of individual garter elements of the type having a molded rubber button and a locking shoulder of the same material secured to the opposite ends of a strip or tab of fabric, and has been so described, although it will be appreciated that it is not limited to the production of this particular article. The method disclosed provides a simple and efficient procedure for making a product of this character which lends itself readily to automatic machine operation. Not only is the mechanism provided by the invention novel in the combination of co-operating elements whereby is accomplished the hitherto unattained result of efficiently manufacturing garter elements of this type on a production basis, but the various constituent units of the combination also comprise improvements over devices intended for similar purposes. The machine also includes mechanism of novel construction for controlling and correlating the movements of the various operative elements each of which performs its intended function in cooperation and timed relation with the others so as to produce a unitary machine which is automatic, efficient and reliable in operation. By using the mechanism and method of this invention, it is possible both to manufacture an article which is a substantial improvement over similar articles previously known to the art and to carry out the manufacture automatically and in such a manner as to make quantity production a practical attainment.

It will be obvious that the invention is not limited to the particular apparatus shown in the drawings, but is capable of a variety of mechanical embodiments. For instance, the construction of each of the various groups of elements specifically described may be varied by substituting equivalent mechanisms for those illustrated, particularly as regards the various link, lever and shaft arrangements by which the movements of the elements are transmitted from one to the other. As one example of such a change, a cam of any desired configuration might be substituted for the eccentric which actuates connecting rod 98, which cam might produce only intermittent movement of said connecting rod instead of continuously reciprocating it as is done by the eccentric. It is also obvious that the mechanism disclosed may be used for manufacturing various products other than the specific form of garter element disclosed, attention being directed to the fact that the molds of the molding wheel are removable and may be replaced so as to form objects of any desired character. In this connection, it is apparent that, instead of forming integral units each consisting of one garter button and one locking member, pairs of buttons and pairs of locking members may be integrally produced and secured to the fabric in alternation. Likewise, the pin of the loading plunger and the cutting and trimming element are made replaceable so that the machine may be adapted to turn out products of varying size and shape.

Furthermore, although the machine herein disclosed comprises only a single production unit, it will be understood that a plurality of like units may be so constructed and connected in cooperating relationship that they will function together in accordance with the invention. For example, as shown in Figs. 21 and 22, the molding wheel 21 may be made sufficiently wide to accommodate a plurality of parallel series of molds so that a number of strips may be produced simultaneously. In this embodiment of the invention, the periphery of the molding wheel is provided with a plurality of circumferentially spaced, transverse grooves 181 each of which is adapted to receive a mold carrying bar 182 having formed in the upper surface thereof a row of mold recesses 183. The molds 184, which may be of the same construction as that shown in Figs. 8ª and 8ᵇ, are secured in place in recesses 183 in any suitable manner as by screws 185, each mold carrying bar 182 then being fastened in its groove 181 by screws 186. It will be understood that in this multiple type machine separate loading, unloading, and cutting and trimming mechanisms similar to those previously described are provided for each circumferential series of molds; on the other hand, only a single drive and timing mechanism, pressure belt and rubber feeding mechanism are required for the synchronous operation of all units, thereby effecting a material saving in construction cost, maintenance and floor space.

Various other changes, which will now become apparent to those skilled in the art, may be made in the procedural steps of the method, and in the form, details of construction and arrangement of the parts of the machine, without departing from the spirit of the invention. Reference is therefore to be had to the appended claims for a definition of the limits of the invention.

What is claimed is:

1. In a machine for molding objects of rubber and securing the same to fabric, the combination of a member having a pluraltiy of spaced molds formed therein, means for loading charges of uncured rubber into said molds, means for bringing a continuous strip of fabric into contact with said member and the exposed surfaces of the rubber in said molds, means for applying pressure against said fabric to force it into contact with the exposed surfaces of said rubber and to maintain a molding pressure on the latter, means for heating the rubber in said molds during the application of said pressure and for a sufficient length of time to effect curing and attachment of the rubber to the fabric by vulcanization, and means for removing the fabric strip and adhering molded rubber objects from said member.

2. In a machine for molding objects of rubber and securing the same to fabric, the combination of a rotatable member having a plurality of circumferentially spaced molds formed in the periphery thereof, means for feeding charges of uncured rubber into said molds, an endless belt surrounding a substantial portion of the periphery of said rotatable member, means for introducing a continuous strip of fabric between said belt and the periphery of said rotatable member and over said charges of rubber in said molds, means for placing said belt under tension so as to exert a pressure against said fabric forcing it into contact with the exposed surfaces of said rubber and maintaining a molding pressure on the latter, means for heating the rubber in said molds during the application of said pressure and for a sufficient length of time to effect curing and attachment of the rubber to the fabric by vulcanization, and means for removing the fabric strip and adhering molded rubber objects from said rotatable member.

3. In a machine for molding objects of rubber and securing the same to fabric, the combination of a rotatable member having a plurality of circumferentially spaced molds formed in the periphery thereof, means for feeding charges of uncured rubber into said molds, means for bringing a continuous strip of fabric into contact with the periphery of said member and the exposed surfaces of the rubber in said molds, means for exerting a molding pressure on said rubber through said fabric strip at the point where the latter first contacts said rotatable member, means for applying additional pressure against said fabric throughout a substantial portion of the periphery of said rotatable member so as to maintain contact between the fabric and the exposed surfaces of said rubber, means for heating the rubber in said molds during the application of said last named pressure and for a sufficient length of time to effect curing and attachment of the rubber to the fabric by vulcanization, and means for removing the fabric strip and adhering molded rubber objects from said rotatable member.

4. In a machine for molding objects of rubber and securing the same to fabric, the combination of a rotatable member having a plurality of circumferentially spaced molds formed in the periphery thereof, means for intermittently rotating said member through distances equal to the distance between successive molds, means for loading charges of uncured rubber into said molds during the time that said member is at rest, means for bringing a continuous strip of fabric into contact with the periphery of said member and the exposed surfaces of the rubber in said molds, means for applying pressure against said fabric forcing it into contact with the exposed surfaces of said rubber and maintaining a molding pressure on the latter, means for heating the rubber in said molds during the application of said pressure and for a sufficient length of time to effect curing and attachment of the rubber to the fabric by vulcanization, means for removing the fabric strip and adhering molded rubber objects from said rotatable member, and means for cutting said strip into individual elements having said molded rubber objects adjacent the ends thereof.

5. In a machine for molding objects of rubber and securing the same to fabric, the combination of a rotatable member having a plurality of circumferentially spaced molds formed in the periphery thereof, means for intermittently rotating said member through distances equal to the distance between successive molds, means for loading charges of uncured rubber into said molds during the time that said member is at rest, means for bringing a continuous strip of fabric into contact with the periphery of said member and the exposed surfaces of the rubber in said molds, means for applying pressure against said fabric forcing it into contact with the exposed surfaces of said rubber and maintaining a molding pressure on the latter, means for heating the rubber in said molds during the application of said pressure and for a sufficient length of time to effect curing and attachment of the rubber to the fabric by vulcanization, means for removing the fabric strip and adhering molded rubber objects from said rotatable member, means effective during the time that said member is at rest for cutting said strip into individual elements having said molded rubber objects secured thereto at desired positions, and common means for controlling the operation of said loading and cutting means.

6. In a machine for making hose attaching elements for garters, the combination of a rotatable member having a plurality of circumferentially spaced molds formed in the periphery thereof, each of said molds being so constructed as to form a garter button, means for feeding charges of uncured rubber into said molds and means for thereafter applying a molding pressure thereto, means for bringing a continuous strip of fabric into contact with the periphery of said member and the exposed surfaces of the rubber in said molds, means for applying pressure against said fabric forcing it into contact with the exposed surfaces of said rubber and maintaining a molding pressure on the latter, means for heating the rubber in said molds during the application of said pressure and for a sufficient length of time to effect curing and attachment of the rubber to the fabric by vulcanization, means for stripping the fabric and adhering molded rubber buttons from said rotatable member and delivering the same to a cutting station, and means for cutting said fabric strip into individual garter elements each having a button secured thereto at a definite and predetermined position.

7. In a machine for making hose attaching elements for garters, the combination of a rotatable member having a plurality of circumferentially spaced molds formed in the periphery thereof, each of said molds being so constructed as to form a garter button and locking member integrally with one another, means for feeding charges of uncured rubber into said molds, means for bringing a continuous strip of fabric into contact with the periphery of said rotatable member and the exposed surfaces of the rubber in said molds, means for applying pressure against said fabric forcing it into contact with the exposed surfaces of said rubber and maintaining a molding pressure on the latter, means for heating the rubber in said molds during the application of said pressure and for a sufficient length of time to effect curing and attachment of the rubber to the fabric by vulcanization, means for stripping the fabric strip and adhering molded rubber buttons and locking members from said rotatable member and delivering the same to a cutting and trimming station, means for cutting and trimming said strip into individual garter elements, said cutting and trimming means being so constructed and arranged that the cutting strokes sever the garter buttons from the integrally molded locking members thereby forming garter elements each having a button adjacent one end thereof and a locking member adjacent the other end.

8. In a machine of the character described including a rotatable member and an endless belt surrounding a substantial portion of the periphery thereof, means for placing said belt under tension so as to exert a variable pressure against the periphery of said member comprising three pulleys about which said belt passes, two of said pulleys being so located that the portion of belt therebetween is in contact with the periphery of said member, a lever, means for rotatably mounting the other pulley at one end of said lever, means for varying the distance between the fulcrum point of said lever and the axis of rotation of said rotatable member, and means for adjusting said lever about its fulcrum point.

9. In a machine of the character described including a rotatable peripheral molding wheel and an endless belt surrounding a substantial portion of the periphery thereof, the combination of three pulleys about which said belt passes, one of said pulleys being so disposed with respect to said molding wheel that its periphery is substantially tangent to that of said wheel and exerts a molding pressure thereagainst, the other two pulleys being so located that the portion of belt between one of them and the first named pulley is in contact with the periphery of said wheel, means for tensioning said belt about said pulleys so as to exert a pressure against the periphery of said wheel, and means for mounting said first named pulley in such manner that the molding pressure exerted thereby against said wheel may be varied at will comprising a bearing block having journalled therein a stub shaft, said block normally clamping said shaft against rotation therewithin, an extension on said shaft formed eccentrically with respect thereto on which extension said first named pulley is rotatably mounted, and means for releasing the clamping engagement between said block and shaft to permit rotation of the latter within said block.

10. In a machine for molding articles of rubber and securing said articles to fabric by vulcanization, the combination of a rotatable mold wheel having a plurality of circumferentially spaced molds formed in the periphery thereof adapted to receive charges of uncured rubber, means for bringing a strip of fabric into contact with the periphery of said wheel and the exposed portions of the rubber in said molds, means for applying sufficient heat and pressure to said rubber and fabric to effect curing of the rubber and adhesion thereof to the fabric by vulcanization, and means for loading charges of uncured rubber into said molds just before said fabric is brought into contact with said wheel.

11. In a machine for molding articles of rubber and securing said articles to fabric by vulcanization, the combination of a rotatable mold wheel having a plurality of circumferentially spaced molds formed in the periphery thereof adapted to receive charges of uncured rubber, means for bringing a continuous strip of fabric into contact with the periphery of said wheel and the exposed portions of the rubber in said molds, means for applying sufficient heat and pressure to said rubber and fabric to effect curing of the rubber and adhesion thereof to the fabric by vulcanization, means for loading charges of uncured rubber into said molds just before said fabric is brought into contact with said wheel, means for cutting said strip of fabric and the adhering molded rubber articles into individual pieces after removal from said wheel, and common means for actuating said charge loading and cutting means.

12. In a machine for molding articles of rubber and securing said articles to fabric by vulcanization, the combination of a rotatable mold wheel having a plurality of circumferentially spaced molds formed in the periphery thereof adapted to receive charges of uncured rubber, means for intermittently rotating said wheel through distances equal to the distance between successive molds, means for bringing a strip of fabric into contact with the periphery of said wheel and the exposed portions of the rubber in said molds, means for applying sufficient heat and pressure to said rubber and fabric to effect curing of the rubber and adhesion thereof to the fabric by vulcanization, and means for loading charges of uncured rubber into said molds just before said fabric is brought into contact with said wheel, said last named means comprising means for advancing rubber in striplike form to a position adjacent the periphery of said wheel, a plunger for severing a piece of said rubber from the strip and forcing it into one of said molds, and means for actuating said advancing means and plunger in timed relation with one another and said wheel rotating means.

13. In a machine for molding articles of rubber and securing said articles to fabric by vulcanization, the combination of a rotatable mold wheel having a plurality of circumferentially spaced molds formed in the periphery thereof adapted to receive charges of uncured rubber, means for intermittently rotating said wheel through distances equal to the distance between successive molds, means for bringing a strip of fabric into contact with the periphery of said wheel and the exposed portions of the rubber in said molds, means for applying sufficient heat and pressure to said rubber and fabric to effect curing of the rubber and adhesion thereof to the fabric by vulcanization, and means for loading charges of uncured rubber into said molds just before said fabric is brought into contact with said wheel comprising a die located adjacent the periphery of said wheel at a position opposite one of said molds when the wheel is at rest, a pair of feed rollers for advancing rubber in striplike form to said die, a plunger for severing a piece of rubber from the strip and forcing it through said die into one of said molds, and means for actuating said feed rollers and plunger in timed relation with one another and said wheel rotating means.

14. In a machine for making hose attaching elements for garters of the type wherein a rotatable mold wheel is utilized for molding rubber garter buttons and securing the same at spaced intervals to a continuous strip of fabric by vulcanization, the combination with said mold wheel of means for stripping said continuous strip of fabric and its adhering molded rubber buttons from said wheel and moving the same to a cutting station, means actuated in timed relation to the movements of said stripping and moving means for cutting said strip into individual garter elements each having a button at one end thereof, means for guiding and tensioning said strip in its movement toward said cutting station, and means for yieldingly engaging said strip at a point beyond the line of cut so as to hold said strip under tension during the cutting operation.

15. In a machine for making hose attaching elements for garters of the type wherein a rotatable mold wheel is utilized for molding rubber garter buttons and securing the same at spaced intervals to a continuous strip of fabric by vulcanization, the combination with said mold wheel of means for stripping said continuous strip of fabric and its adhering molded rubber buttons from said wheel and moving the same to a cutting station comprising a reciprocable member movable toward and away from the periphery of said wheel, means for moving said member in timed relation to the movements of said wheel, and a carrier movable with said member having a portion so constructed and arranged as to engage one of said molded rubber buttons and by said engagement move said strip when said reciprocable member is moved away from said wheel.

16. In a machine for making hose attaching elements for garters of the type wherein a rotatable mold wheel is utilized for molding rubber garter buttons and securing the same at spaced intervals to a continuous strip of fabric by vulcanization, the combination with said mold wheel of means for stripping said continuous strip of fabric and its adhering molded rubber buttons from said wheel and moving the same to a cutting station comprising a reciprocable member movable toward and away from the periphery of said wheel, means for moving said member in timed relation to the movements of said wheel, a carrier movable with said member having a portion so constructed and arranged as to engage one of said molded rubber buttons and by said engagement move said strip when said reciprocable member is moved away from said wheel, said carrier being pivotally mounted with respect to said reciprocable member, and means for moving said carrier about its pivot out of engagement with the button when said reciprocable member is moved toward said wheel.

17. In a machine for making hose attaching elements for garters of the type wherein a rotatable mold wheel is utilized for molding rubber garter buttons and securing the same at spaced intervals to a continuous strip of fabric by vulcanization, the combination with said mold wheel of means for stripping said continuous strip of fabric and its adhering molded rubber buttons from said wheel and moving the same to a cutting station comprising a reciprocable member movable toward and away from the periphery of said wheel, means for moving said member in timed relation to the movements of said wheel, a carrier movable with said member having a portion so constructed and arranged as to engage one of said molded rubber buttons and by said engagement move said strip when said reciprocable member is moved away from said wheel and means for limiting the movement of said reciprocable member so located as to bring said strip to rest in cutting position, and means actuated in timed relation to the movements of said reciprocable member for cutting said strip into individual garter elements each having a button secured thereto.

18. In a machine for making hose attaching elements for garters of the type wherein an intermittently rotatable mold wheel is utilized for molding rubber garter buttons and securing the same at spaced intervals to a continuous strip of fabric by vulcanization, the combination with said mold wheel of means for stripping said continuous strip of fabric and its adhering molded rubber buttons from said wheel and moving the same to a cutting station comprising a reciprocable member movable toward and away from the periphery of said wheel, means for intermittently moving said member in timed relation to the movements of said wheel, a carrier movable with said member having a portion so constructed and arranged as to engage one of said molded rubber buttons and by said engagement move said strip when said reciprocable member is moved away from said wheel and means for limiting the movement of said reciprocable member so located as to bring said strip to rest in cutting position, and means effective while said reciprocable member and carrier are at rest for cutting said strip into individual garter elements each having a button at one end thereof, the button engaging portion of said carrier covering the button and defining the line of cut to be made by said cutting means.

19. In a machine for making hose attaching elements for garters of the type wherein an intermittently rotatable mold wheel is utilized for molding rubber garter buttons and locking members integrally with one another and securing the same at spaced intervals to a continuous strip of fabric by vulcanization, the combination with said mold wheel of means for stripping said continuous strip of fabric and its adhering molded rubber buttons and locking members from said wheel and moving the same to a cutting station comprising a reciprocable member movable toward and away from the periphery of said wheel, means for intermittently moving said member in timed relation to the movements of said wheel, a carrier movable with said member having a portion so constructed and arranged as to engage one of said molded rubber buttons and by said engagement move said strip when said reciprocable member is moved away from said wheel, said carrier having another portion adapted to engage the locking member which is molded integrally with said button and means for limiting the movement of said reciprocable member so located as to bring said strip to rest in cutting position, and means actuated in timed relation to the movements of said reciprocable member for cutting said strip into individual garter elements each having a button at one end thereof and a locking member at the other end, the button and locking member engaging portions of said carrier being separated by a space defining the line of cut to be made by said cutting means.

20. A method of making hose attaching elements for garters comprising the steps of molding a plurality of garter buttons and locking members from rubber, said buttons and locking members being formed in integrally united pairs, securing said integrally formed pairs of buttons and locking members to a continuous strip of fabric at spaced intervals therealong, and then cutting said continuous strip with its adhering buttons and locking members at such points as to separate each integrally formed pair and form individual garter elements each having a button adjacent one end and a locking member adjacent the other end.

21. A method of making hose attaching elements for garters comprising the steps of molding a plurality of garter buttons and locking members from uncured rubber, each button being formed integrally with a locking member, bringing a continuous strip of fabric into pressure contact with the bases of said buttons and locking members simultaneously with the molding step and at the same time applying sufficient heat to both cure the rubber buttons and locking members and effect adhesion thereof to said fabric strip by vulcanization, and then cutting said continuous strip with its adhering buttons and locking members at such points as to separate each button from its integrally molded locking member and form individual garter elements each having a button adjacent one end and a locking member adjacent the other end.

HENRY GORA.